(12) United States Patent
Hazelton

(10) Patent No.: US 9,506,724 B1
(45) Date of Patent: Nov. 29, 2016

(54) DOWNRANGE WIND PROFILE MEASUREMENT SYSTEM AND METHOD OF USE

(71) Applicant: Lyman Robert Hazelton, Euless, TX (US)

(72) Inventor: Lyman Robert Hazelton, Euless, TX (US)

(73) Assignee: Lyman Robert Hazelton, Euless, TX (US)

( * ) Notice: Subject to any disclaimer, the term of this patent is extended or adjusted under 35 U.S.C. 154(b) by 0 days.

(21) Appl. No.: 15/161,409

(22) Filed: May 23, 2016

(51) Int. Cl.
  *G01W 1/00* (2006.01)
  *G01S 13/95* (2006.01)
  *F41G 3/08* (2006.01)
  *F41G 1/38* (2006.01)
  *B64D 43/00* (2006.01)
  *G05D 1/10* (2006.01)

(52) U.S. Cl.
  CPC ............... *F41G 3/08* (2013.01); *B64D 43/00* (2013.01); *F41G 1/38* (2013.01); *G05D 1/101* (2013.01)

(58) Field of Classification Search
  CPC ........... F41G 3/08; F41G 1/38; B64D 43/00; G05D 1/101

USPC .............. 702/3, 92, 94, 96; 244/155; 342/26
See application file for complete search history.

(56) References Cited

U.S. PATENT DOCUMENTS

| | | | |
|---|---|---|---|
| 7,365,675 B2 * | 4/2008 | Pearlman ................ | G01S 7/003 342/115 |
| 9,389,132 B1 * | 7/2016 | Jensen ..................... | G01L 5/16 |

* cited by examiner

*Primary Examiner* — John H Le
(74) *Attorney, Agent, or Firm* — Eldredge Law Firm; Richard Eldredge

(57) ABSTRACT

A downrange wind measurement system includes an aerial vehicle with a global positioning system and a communication device; and a remote computer with a display for viewing access and a transceiver. A method to assist a shooter adjust for a wind speed and a wind angle of a wind prior to make a downrange shot includes creating a flight path for an aerial vehicle to fly alongside a projectile path; determining locations for a circular flight path via the flight path; measuring the wind speed and the wind angle along the circular flight path; transmitting the wind speed and the wind angle to a remote computer; and computing via the remote computer scope adjustments with the wind speed and wind angle.

4 Claims, 6 Drawing Sheets

DOWNRANGE WIND PROFILE MEASUREMENT SYSTEM AND METHOD OF USE

BACKGROUND

1. Field of the Invention

The present invention relates generally to downrange measurement systems and methods of use.

2. Description of Related Art

Shooting rifles and/or other types of firearms downrange is well known in the art. To increase accuracy of the shot, the firearms are generally equipped with a magnifying scope that allows the shooter to view the target at the far distance and to thereafter align the firearm within the proper position to make the shot.

FIG. 1 depicts a simplified schematic of a conventional process 101 to manipulate a rifle 105 to shoot a projectile at a target 107 along a projectile path 109. During use, the shooter adjusts the scope 103 and/or other magnification viewing means to view the target 107 prior to taking the shot.

It is commonly known that the greater the distance between points A to B, the greater the difficulty in accurately hitting the target. It should be understood that various factors exist when taking a shot, for example, changes in wind speeds and angles along the projectile path 109. In the exemplary embodiment, three different wind speeds 111, 113, and 115 are depicted with arrows indicating variations in wind velocities and angles relative to the projectile path 109.

One of the problems commonly associated with conventional shooting methods includes the changes in wind speeds and angles along the projectile path, which in turn affects the ability of the shooter to accurately hit the target. The problem is magnified as the distance between A and B increases.

Although great strides have been made in the area to help assisted shooters in the process of accurately hitting downrange targets, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
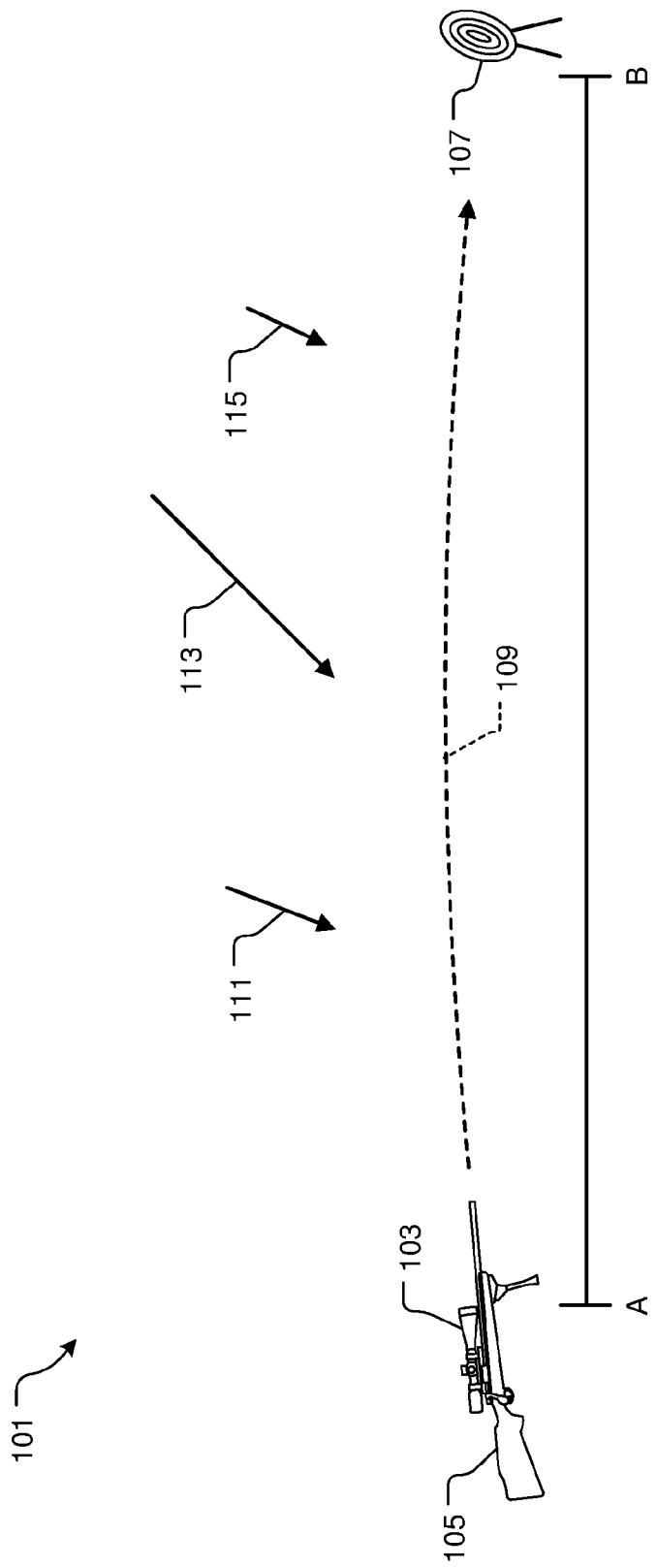
FIG. 1 is a simplified schematic of a conventional shooting process.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and method to manipulate, aim, and shoot a firearm. Specifically, the system and method of the present application provides rapid and effective means to determine and assist the shooter in compensating for wind speed and angle along the projectile path. This feature is achieved via an aerial vehicle that measures wind speed and angle at selected locations along the projectile path and is achieved by relaying the measured wind speed(s) and angle(s) to a remote computer proximate to the shooter for computing adjustments for the scope sight. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
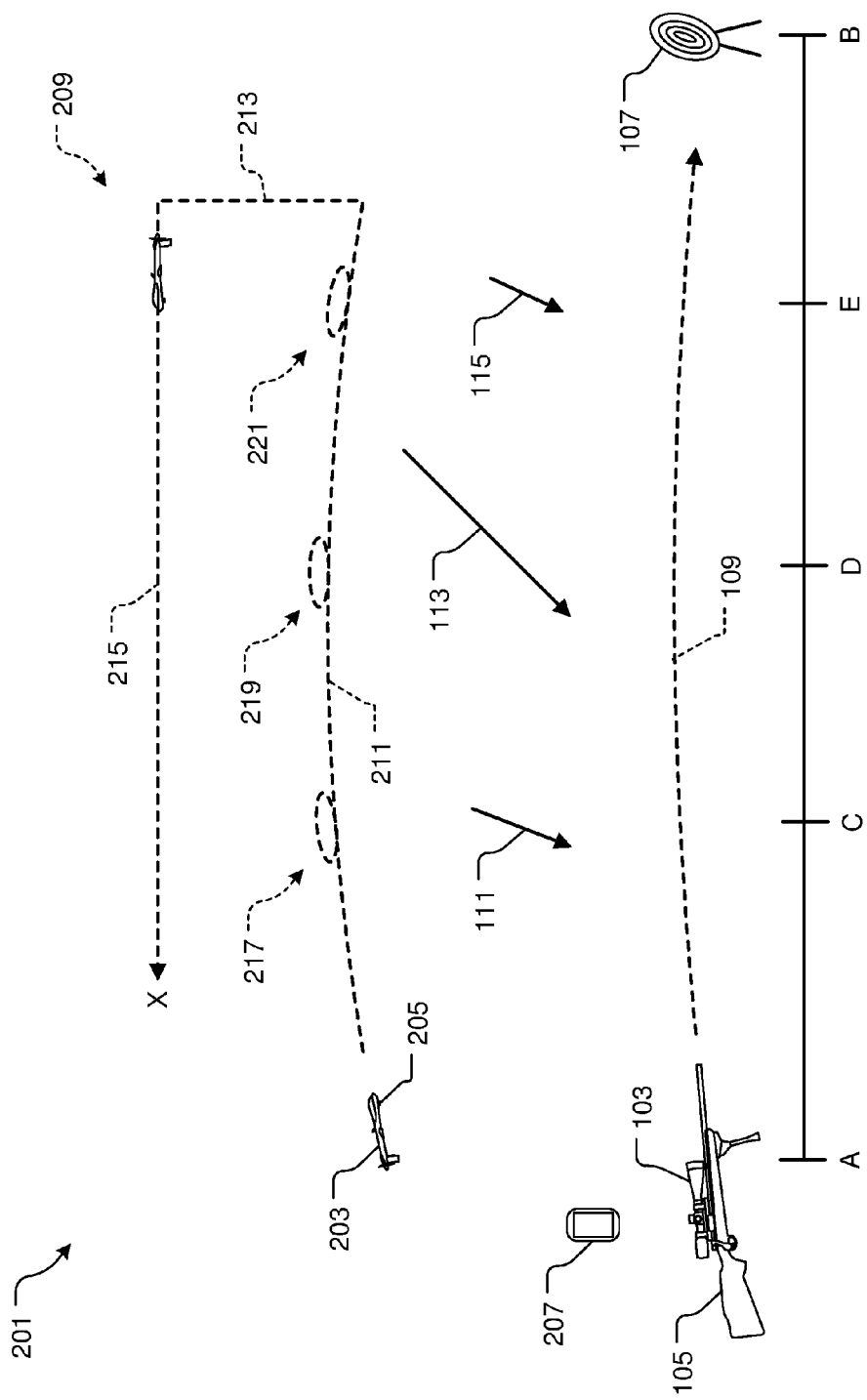
FIG. 2 is a simplified schematic of a target shooting system and method of use in accordance with a preferred embodiment of the present application.

Referring now to the drawings wherein like reference characters identify corresponding or similar elements throughout the several views, FIG. 2 depicts a simplified schematic of a downrange wind profile measurement system and method of use in accordance with a preferred embodiment of the present application. It will be appreciated that system 201 overcomes one or more of the above-listed problems commonly associated with the conventional methods to shoot a firearm downrange.

In the contemplated embodiment, system 201 includes one or more of an aerial vehicle 203 with a communication device 205 configured to transmit wind speed and wind angle data to a remote computer 207. During use, the aerial vehicle 203 is preferably preprogrammed to fly along a flight path 209 that includes a first section 211 preferably extending along the projectile path 109, a second section 213 extending a predetermined distance away from the target location 107, and a third section 215 that returns the aerial vehicle back to either the shooter or a selected location.

The flight path section 211 includes elliptical or circular paths 217, 219, and 221 for flight where the wind speeds and angles, as depicted with arrows 111, 113, and 115 are determined at positions C, D, and E along the projectile path 109. It will be appreciated that one or more additional or less circular paths could be flown along the fight path. Further, it should be understood that the flight paths do not need to be circular in shape, but could include other geometric flight paths.

After the aerial vehicle has obtained wind speeds and angles at locations C, D, and E, the aerial vehicle 203 starts a new flight path along section 213 away from the target position. Shortly thereafter, the aerial vehicle 203 returns along flight path 215 and transmits the wind speed and angle data to the remote computer 207 during this section via communication device 205. The turn away from the ballistic path includes any combination of turn or change in altitude to clear the path so the shot can be taken without interference.

One of the unique features believed characteristic of the present invention is the use of an aerial vehicle 203 to measure wind speed and angle along the projectile path 109. As depicted in FIG. 2, it should be understood that the projectile path has an altitude relative to the ground surface and travel along an arc. Accordingly, the aerial vehicle 203 is also configured to travel along the anticipated projectile arc path to measure wind field information to provide a more accurate calculation. The wind speed and angle data allows the shooter to adjust the scope to more accurately compensate for wind along the projectile path. Thus, system 201 provides effective means for accurate shooting downrange.

Figure 3:
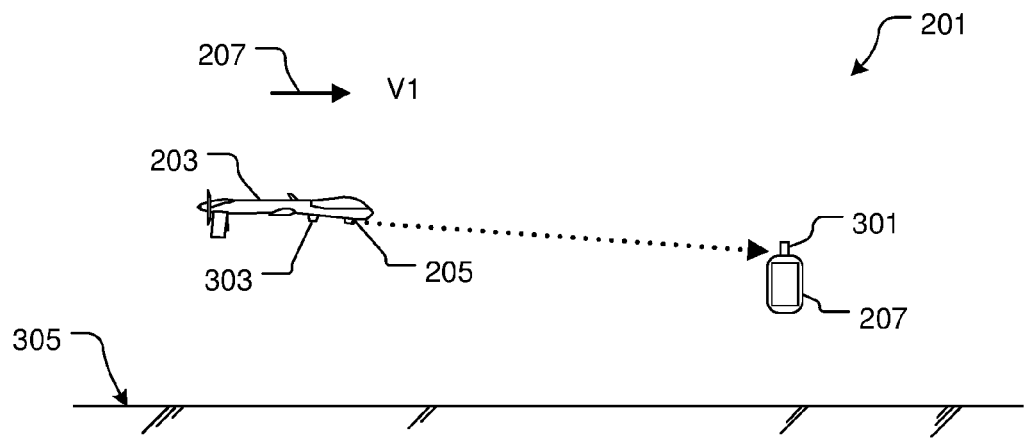
FIG. 3 is a simplified schematic of a communication system of the shooting system of FIG. 2.

Referring now to FIG. 3, a simplified schematic of the communication system between the aerial vehicle 203 and computer 207 is shown. It will be appreciated that aerial vehicle 203 includes a communication device 205 that transmits and receives data to a transceiver 301 of computer 207. The computer 207 includes the necessary software, hardware, and algorithms to assist the shooter in aligning the scope to make an accurate shot in accordance with the wind speeds and angles taken along the projectile path. In the preferred embodiment, the computer 207 provides the shooter with required adjustment movements of the scope to make an accurate shot.

Figure 5:
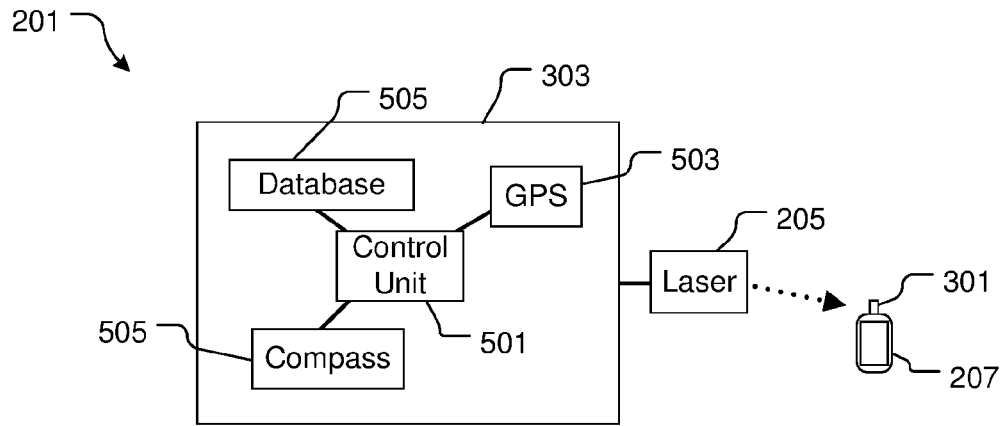
FIG. 5 is a computer system of the system of FIG. 2.

It should be understood that aerial vehicle 203 is also provided with a computer system 303 that determines the position, speed and angle of the aircraft during flight. Discussion of these features are shown in FIG. 5 and discussed below.

Figure 4:
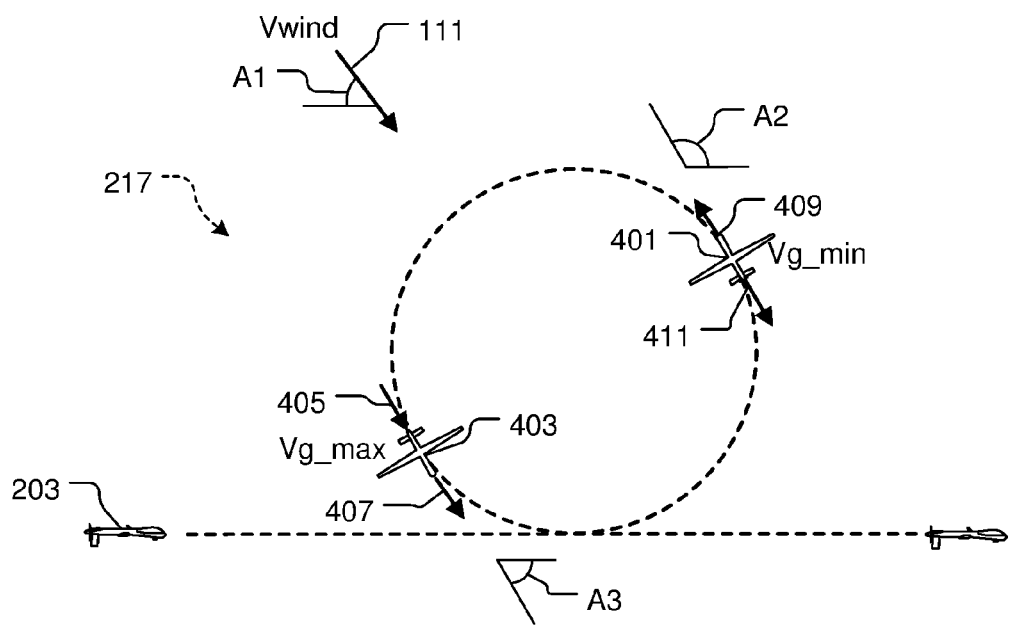
FIG. 4 is a top view of a flight path of the system of FIG. 2.

In FIG. 4, a schematic of the circular flight pattern 217 is shown. The schematic further illustrates the features of the process of measuring wind speed "Vwind" and angle "A1" while flying in the circular pattern 217.

At position 401, the aerial vehicle moves into the wind at an angle A2 with a measured Velocity. It should be understood that the aerial vehicle travels at a constant air speed around path 217—a feature critical to achieving the desired results. The total velocity (ground velocity) of the aerial vehicle at position 401 is the velocity of air "Vair", as indicated by arrow 409, less the velocity of the wind "Vwind", as indicated by arrow 411.

At position 403, the aerial vehicle moves away from the wind at an angle A3, which is equal to 180 degrees minus A2. The total velocity at this position is Vair, as indicated by arrow 407 plus Vwind, as indicated by arrow 405.

At positions 401, 403 respective maximum ground velocity "Vg_max" and minimum ground velocity "Vg_min" are measured to determine Vwind. At position 403, the Vg_max=Vair+Vwind; while at position 401, the Vg_min=Vair−Vwind. Taking wind and ground speed measurements at these locations provides means to determine wind speed with equation Vwind=(Vg_max−Vg_min)/2. The angle of the wind is determined by (A1+A2)/2. For example, if the angle A2=240 degrees, while A3=60 degrees, the wind speed angle would equal 150 degrees relative to the projectile path. It should be understood that the roll angle and the air speed of the aerial vehicle must remain constant to utilize the above-referenced equations.

In FIG. 5, the onboard computer system 303 is shown with one or more of a control unit 501 operably associated with a GPS device 503, a database 505, and an optional compass device 505. During use, the system 303 is configured to determined wind speed and angle via the compass and/or GPS device as discussed above. The measured wind speed and angle data are stored in the database and thereafter transmitted to the transceiver 301 via the communication device 205.

In the preferred embodiment, communication device 205 is a laser configured to transmit the data to the transceiver. This feature allows the aircraft to communicate the data without the fear interception from one or more third parties. However, it will be appreciated that alternative embodiments could utilize other forms of wireless communication means in lieu of the preferred laser embodiment.

Figure 6:
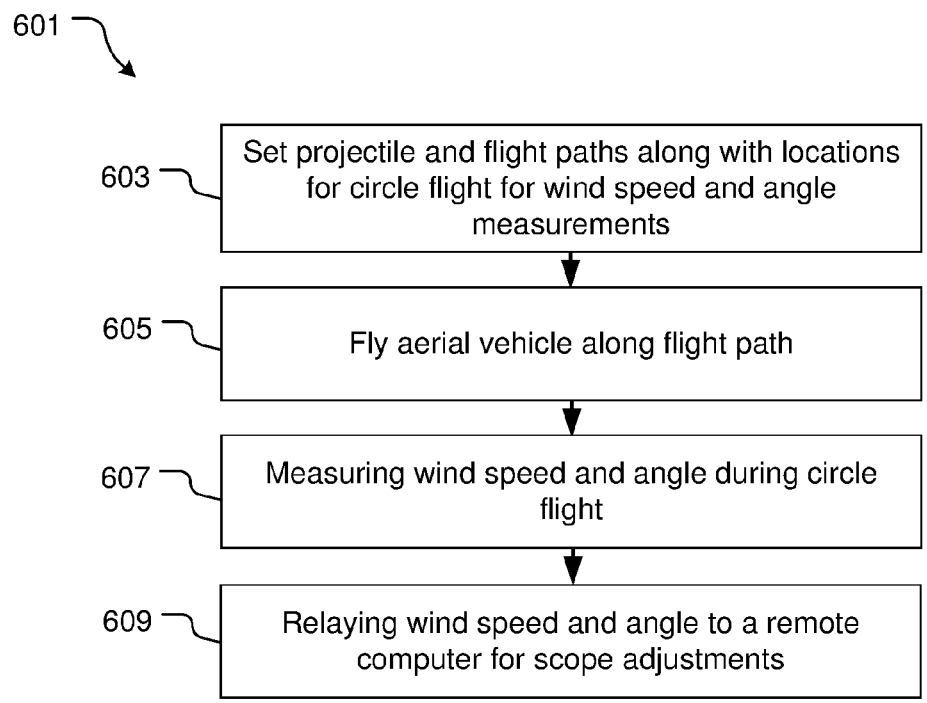
FIG. 6 is a flowchart depicting the preferred method of use.

In FIG. 6, a flowchart 601 depicting the preferred process is shown. The process includes programming the aerial vehicle with a flight path along a projectile path of an initial, no wind ballistic computation, as depicted in box 603. A predetermined set of flight elliptical paths are preferably preprogramed along the flight path along determined distances relative to each other. It will be appreciated that that aerial vehicle can also be adapted to determine the number of circular paths along the flight path in real-time in accordance with an alternative embodiment. It will also be appreciated that the aerial vehicle can be controlled by the shooter and/or third party in lieu of being preprogrammed, as discussed above.

The next step includes activating and flying the aircraft along the flight path. During flight, the aerial vehicle is configured to measure wind velocities and angles at selected locations, as depicted in boxes 605, 607. The aerial vehicle has an onboard flight control computer configured to determine wind speed by sensing ground speed and at selected locations along a circular flight path. Thereafter, the data from the onboard flight control computer is relayed to a remote computer via a communication device, as depicted in box 609.

Figure 7:
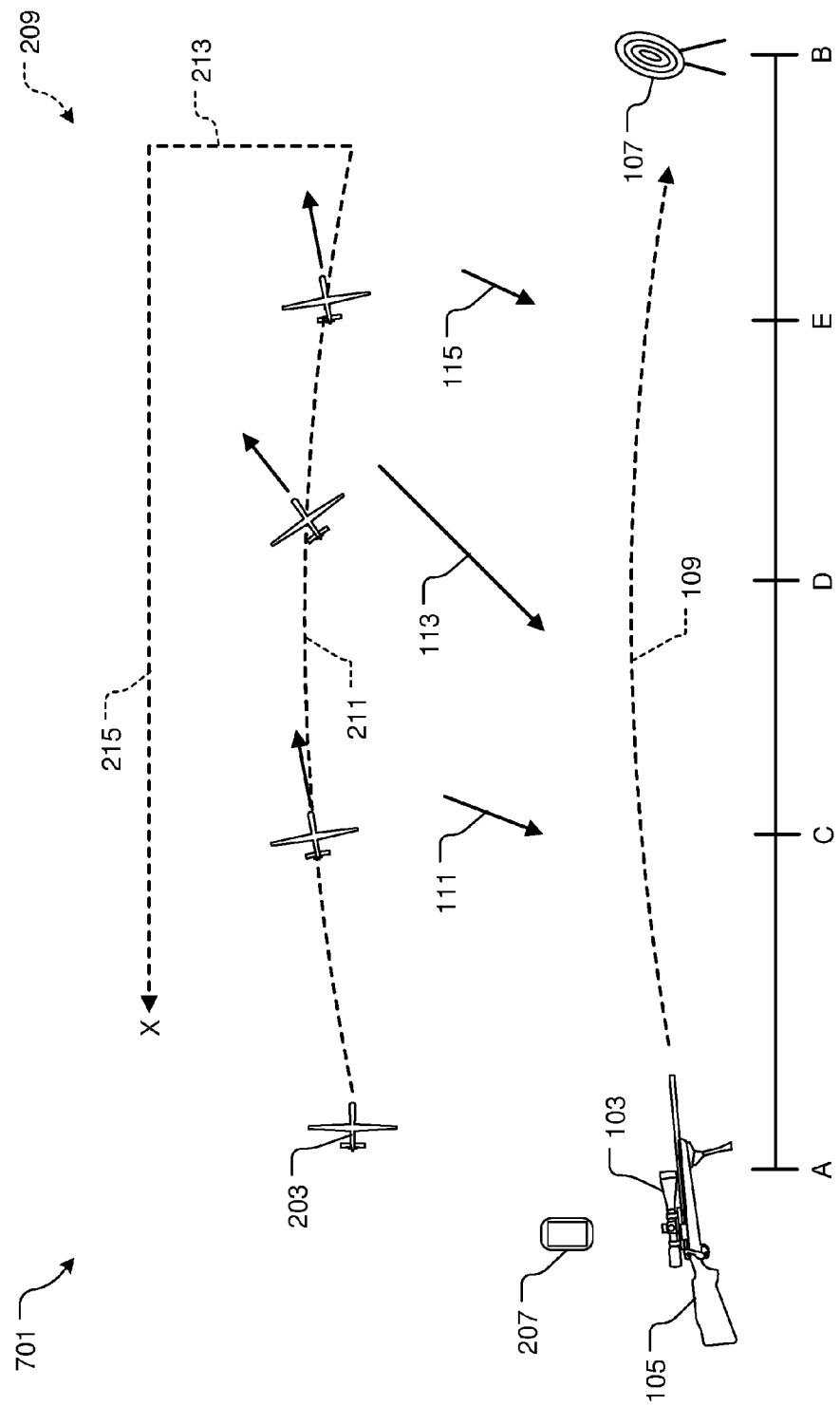
FIG. 7 is a simplified schematic of a target shooting system and method of use in accordance with an alternative embodiment of the present application.
Figure 8:
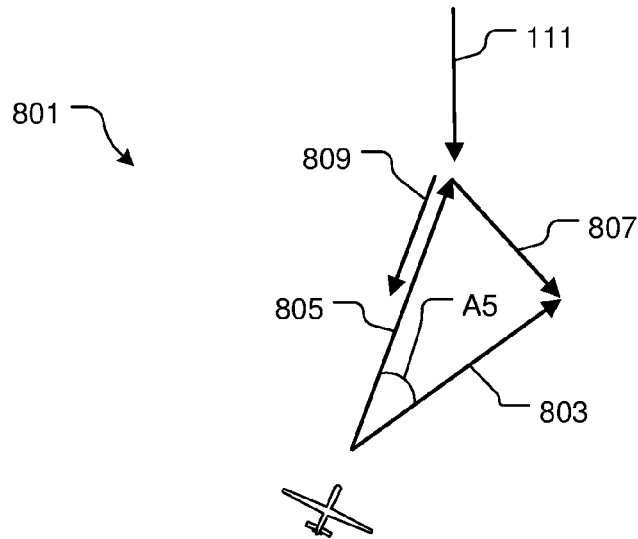
FIG. 8 is a vector diagram of the wind speed utilizing the method of FIG. 7.
Figure 9:
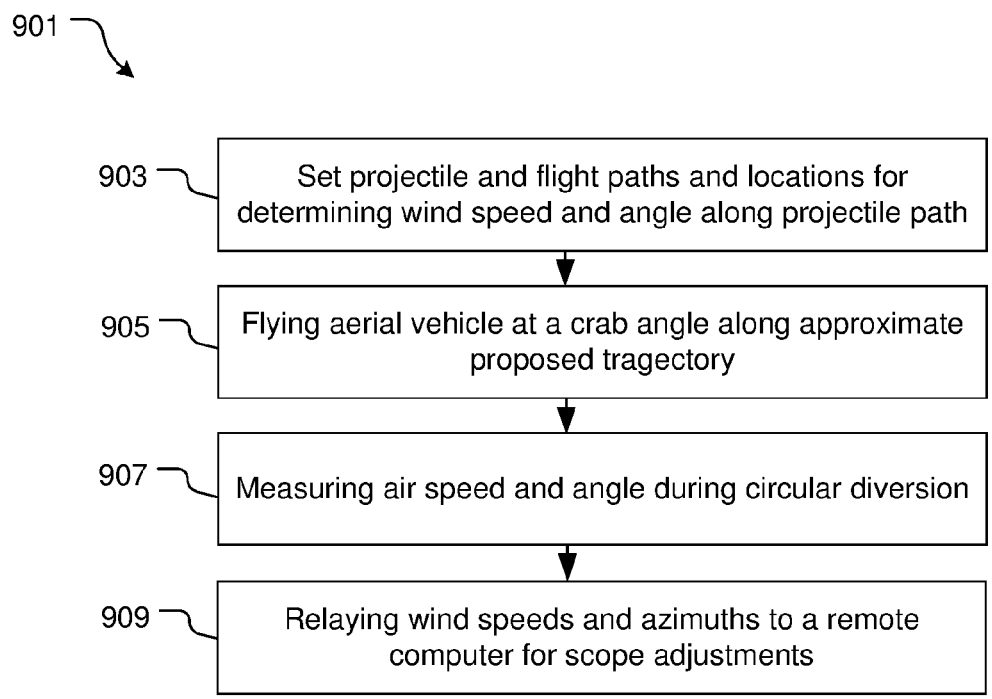
FIG. 9 is a flowchart depicting the alternative method of use.

Referring now to an alternative embodiment of the present invention. FIGS. 7-9 depict various views and a flowchart of an alternative system 701 configured to achieve the same results as system 201; however, in the contemplated embodiment, the aerial vehicle 203 is configured to crab at positions C, D, and E to determine the wind speed and angle.

FIG. 8 illustrates a vector diagram 801 of the aircraft and wind velocities. Arrow 111 indicates the wind speed vector; arrow 803 indicates the known velocity of the aerial vehicle; arrow 805 indicates the measured velocity of the aerial vehicle; arrow 807 indicates the component of the wind at a right angle to arrow 803; arrow 809 indicates a component of the wind at a parallel angle to arrow 805. Accordingly, knowing the angle of travel A5 from the GPS and/or compass, the wind speed and angle are calculated with simple geometry equations.

It should be understood that the known velocity, as indicated by arrow 803, is predetermined by measuring the velocity of the aircraft in a wind tunnel and/or other suitable means to determine the speed of the aircraft relative to a ground position during a flight condition.

In FIG. 9, a flowchart 901 depicts the process of the alternative process, which includes the steps similar to flowchart 601, as indicated by boxes 903-909. However, in the alternative embodiment, the wind speed and angle are determined by flying the aerial vehicle at a crab angle relative to the wind direction.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to assist a shooter adjust for a wind speed and a wind angle of a wind prior to make a downrange shot, the method comprising:

flying an aerial vehicle along a predetermined flight path;

selecting locations along the predetermined flight path for a circular flight path;

measuring the wind speed and the wind angle via an onboard computer system secured to the aerial vehicle along the circular flight path;

transmitting the wind speed and the wind angle via a communication device secured to the aerial vehicle to a transceiver of a remote computer;

measuring a minimum aircraft velocity via the onboard computer system as the aerial vehicle turns directly into the wind;

measuring a maximum aircraft velocity via the onboard computer system as the aerial vehicle turns directly away from the wind;

calculating the wind speed and the wind angle with the remote computer in accordance to the measured maximum aircraft velocity and the minimum aircraft velocity; and providing scope adjustments with the remote computer to assist the shooter based on the calculated wind speed and the calculated wind angle.

2. The method of claim 1, further comprising:

transmitting the wind speed and the wind angle on a return flight.

3. The method of claim 1, further comprising:

transmitting the wind speed and the wind angle via a laser carried on the aerial vehicle.

4. The method of claim 1, further comprising:

measuring a first angle of the aerial vehicle heading via a global positioning system at the minimum aircraft velocity position;

measuring a second angle of the aerial vehicle heading via the global positioning system at the maximum aircraft velocity position;

transmitting the minimum aircraft velocity and the maximum aircraft velocity via the communication device secured to the aerial vehicle to the remote computer; and calculating the wind angle via the remote computer in accordance to the measured maximum aircraft velocity and the minimum aircraft velocity.

* * * * *